United States Patent
Suryanarayana et al.

(10) Patent No.: US 11,675,908 B2
(45) Date of Patent: Jun. 13, 2023

(54) UNATTENDED DEPLOYMENT OF INFORMATION HANDLING SYSTEMS

(71) Applicant: Dell Products L.P., Round Rock, TX (US)

(72) Inventors: Shekar Babu Suryanarayana, Bangalore (IN); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/377,000

(22) Filed: Jul. 15, 2021

(65) Prior Publication Data

US 2023/0019303 A1    Jan. 19, 2023

(51) Int. Cl.
*G06F 21/57*    (2013.01)
*G06F 21/31*    (2013.01)
*H04L 9/32*     (2006.01)
*G06F 8/60*     (2018.01)
(Continued)

(52) U.S. Cl.
CPC ............ *G06F 21/575* (2013.01); *G06F 8/60* (2013.01); *G06F 8/61* (2013.01); *G06F 21/31* (2013.01);
(Continued)

(58) Field of Classification Search
CPC ...... G06F 8/60–66; G06F 21/31; G06F 21/51; G06F 21/57; G06F 21/575; G06F 2221/034; H04L 9/3247
(Continued)

(56) References Cited

U.S. PATENT DOCUMENTS 11,003,758 B2 *  5/2021  Suzuki .................. G06F 21/445
11,249,742 B1 *  2/2022  Paudel ...................... G06F 8/61
(Continued)

OTHER PUBLICATIONS

Demchenko, Yuri, et al., Enabling Automated Network Services Provisioning for Cloud Based Applications Using Zero Touch Provisioning, UCC '15: Proc. of the 8th International Conference on Utility & Cloud Computing, Dec. 2015, pp. 458-464, [retrieved on Jul. 28, 2022], Retrieved from the Internet: <URL:http://dl.acm.org/>.*

(Continued)

*Primary Examiner* — Geoffrey R St Leger
(74) *Attorney, Agent, or Firm* — Jackson Walker L.L.P.

(57) ABSTRACT

A method for deploying an information handling system (platform) determines whether a hardware key coupled to the platform constitutes a deployment key by validating a GUID of the key against a deployment key signature, generated by a trusted server and stored on the key. If the key is validated, a trust factor evaluation is performed by validating the deployment key against a second key, which is bound to a nonvolatile storage component containing a second key signature, generated by the trusted server based on a GUID of the nonvolatile storage component. Upon validating the trust factor, the platform boots into an unattended deployment mode loaded from the deployment key and validates an unattended deployment binary stored in the deployment key against the second key signature to establish a trusted execution session for loading unattended deployment modules from the deployment key and deploying the platform by executing the unattended deployment modules.

20 Claims, 4 Drawing Sheets

(51) Int. Cl.
   *G06F 8/61* (2018.01)
   *G06F 21/51* (2013.01)
   *G06F 21/73* (2013.01)

(52) U.S. Cl.
   CPC .............. *G06F 21/51* (2013.01); *G06F 21/57* (2013.01); *G06F 21/73* (2013.01); *H04L 9/3247* (2013.01); *G06F 2221/034* (2013.01)

(58) Field of Classification Search
   USPC .................................................. 717/168–178
   See application file for complete search history.

(56) References Cited

U.S. PATENT DOCUMENTS

| | | | | |
|---|---|---|---|---|
| 11,269,984 | B2* | 3/2022 | Raskin | ................... H04L 9/3247 |
| 2003/0009687 | A1* | 1/2003 | Ferchau | ................... G06F 21/64 |
| | | | | 713/176 |
| 2006/0195839 | A1* | 8/2006 | Lin | ..................... G06F 11/3664 |
| | | | | 717/174 |
| 2013/0254759 | A1* | 9/2013 | Xu | ............................ G06F 8/61 |
| | | | | 717/174 |
| 2020/0186365 | A1* | 6/2020 | Kumar | ................... H04L 9/0891 |
| 2020/0319899 | A1* | 10/2020 | Wille | .................. G06F 9/44584 |

OTHER PUBLICATIONS

Herrick, Dan. et al., Sustainable Automated Software Deployment Practices, SIGUCCS '13: Proceedings of the 41st annual ACM SIGUCCS conference on User services, Nov. 2013, pp. 189-196, [retrieved on Jul. 28, 2022], Retrieved from the Internet: <URL:http://dl.acm.org/>.*

* cited by examiner

UNATTENDED DEPLOYMENT OF INFORMATION HANDLING SYSTEMS

TECHNICAL FIELD

The present disclosure relates to information handling systems and, more specifically, secure deployment of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Deployment, which may refer to the initial configuration and verification of hardware and software for an information handling system, is an important consideration for the manufacturer and/or distributor of an information handling system. Unattended deployment, also sometimes referred to as zero-touch deployment, refers to an automated deployment involving little or no intervention by the customer.

SUMMARY

Generally, the deployment of an information handling system for end customer use includes the configuration of platform settings that are only accessible in a non-secured operating environment sometimes referred to as a manufacturing mode. At the same time, however, unattended deployments generally require an intelligent, release-mode protocol capable of executing required scripts and supporting graphical interfaces. Implementing zero-touch deployment is challenging at least because enabling such protocols to access platform settings is inherently risky, particularly with respect to platforms that lack an out-of-band manager, such as a baseboard management controller (BMC), to create and support a secure environment for unattended deployment.

Problems associated with implementing unattended deployment of information handling systems are addressed by unattended deployment systems and methods disclosed herein. In accordance with disclosed subject matter, an unattended deployment method employs 3-factor authentication and dynamic trust factor evaluation to support a secure execution environment, referred to herein as a deploy mode, to validate and execute digitally signed deployment scripts stored on a trusted hardware key referred to herein as the deployment key. The deploy mode may be a type of manufacturing mode enabling the information handling system to run unsigned code including scripts and to configure one or more platform settings typically accessible only in a manufacturing mode. The deployment key is itself validated against a second key, referred to herein as the nonvolatile key or NV key, which is bound to a nonvolatile storage component of the platform.

In at least one embodiment, an unattended deployment method begins when a power on signal is detected while a key resource, such as a USB key or a network storage resource, is connected to or otherwise communicatively coupled to the platform. Platform BIOS may determine whether the key resource is a deployment key required for unattended deployment by validating a unique identifier of the key resource against a deployment key signature. The deployment key signature is generated by a trusted server based on the key's unique identifier and stored on the key resource. For embodiments in which the key resource is a USB key, the key's unique identifier may be the root path of the USB key.

Upon validating the key resource as a deployment key for the platform, BIOS performs a trust factor evaluation by validating the deployment key against a second key, which is bound to a uniquely identifiable component of the platform. The uniquely identifiable component may be a nonvolatile storage device, e.g., the platform's BIOS flash, in which case the second signature may be referred to herein as the NV signature. The NV signature is generated by the trusted server based on a globally unique identifier (GUID) of the nonvolatile storage component. The trust factor evaluation may validate the nonvolatile storage component's GUID against the NV signature. The trust factor validation may further include launching an authorization module to read an administrative password from the deployment key and validate the administrative password against a password hash, generated by the trusted server, stored in the deployment key.

Upon validating the trust factor, the platform may then boot into the deploy mode, which is loaded from the trusted deployment key, and validate executable code stored in the deployment key, referred to herein as unattended deployment binary, against the second key signature. Successful validation of the unattended deployment binary establishes a trusted execution session during which unattended deployment modules may be loaded from the deployment key and the information handling system may be deployed by executing the deployment modules.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE ILLUSTRATED VIEWS

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic.

Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
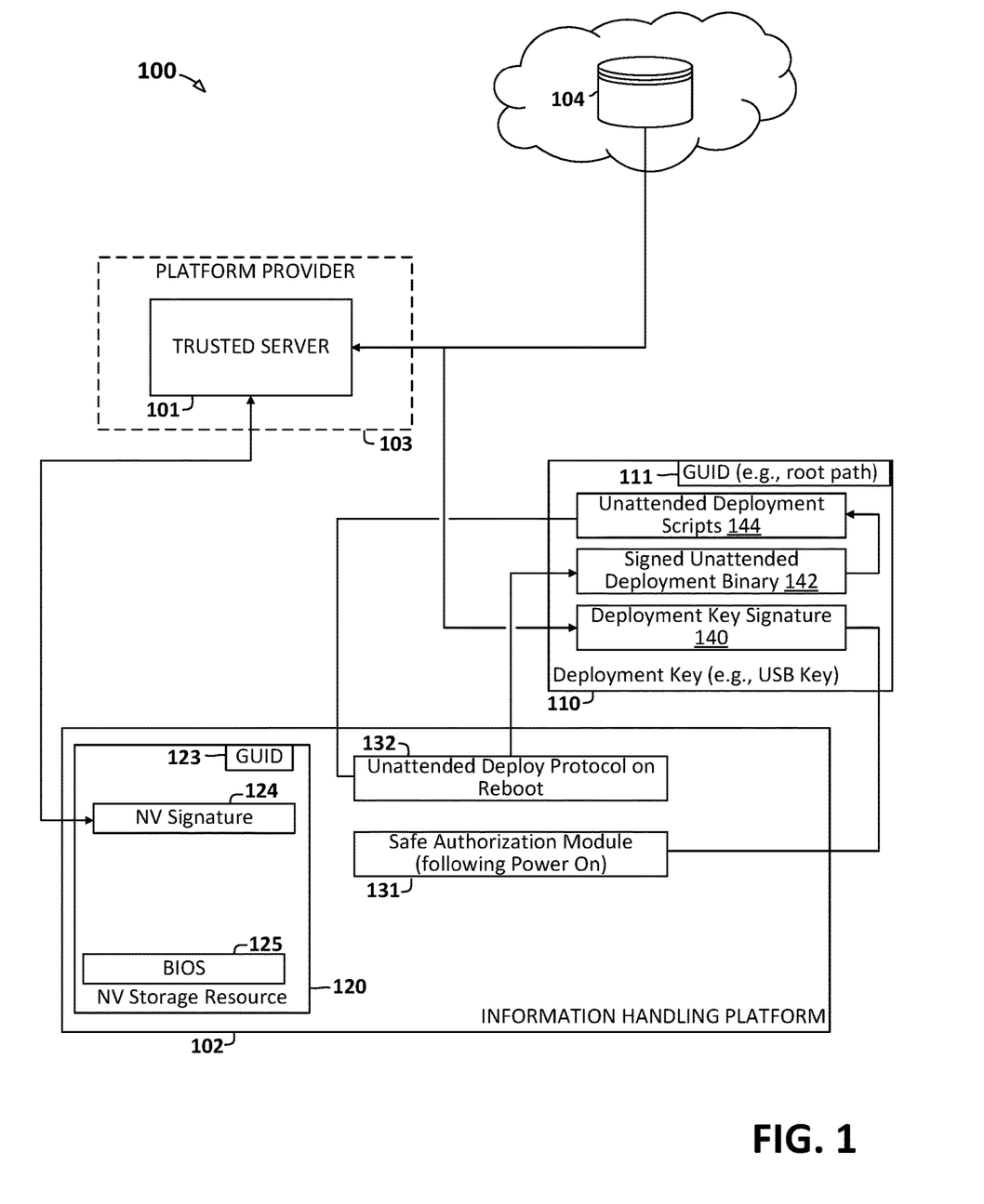
FIG. 1 illustrates a flow diagram of an unattended deploy method in accordance with disclosed subject matter.

Referring now to the drawings, FIG. 1 illustrates a deployment system 100 for implementing unattended deployment of an information handling platform 102. The deployment system illustrated in FIG. 1 includes a server system, referred to herein as trusted server 101, a deployment key 110 containing various unattended deployment objects disclosed herein, and an information handling platform 102 or, more simply, platform 102, targeted for unattended deployment. While platform 102 may encompass any suitable information handling system, for the sake of brevity and clarity, the platform 102 illustrated in the drawings is, unless indicated otherwise, assumed to be a desktop, laptop, or notebook computer as illustrated and described with respect to FIG. 4. In the interests of clarity and brevity, conventional and well known elements of platform 102, including the platform's central processing unit(s) and system memory resources, are not explicitly depicted in FIG. 1.

Deployment key 110 may be implanted as a USB key, i.e., a flash memory-based drive configured to plug into a USB port of platform 102, but deployment key 110 is not restricted to USB key embodiments. For example, in some embodiments, not explicitly depicted, a network share may serve as deployment key 110.

The platform 102 illustrated in FIG. 1 includes a non-volatile (NV) storage resource 120 with a machine-readable globally unique identifier (GUID) 123. The NV storage resource 120 shown in FIG. 1 further includes one or more digital signatures, including an NV signature 124, used to implement a secure unattended deployment process as disclosed herein. NV storage resource 120 may be implemented with a serial peripheral interface (SPI) flash memory device or any other suitable NV storage device. The NV storage resource 120 illustrated in FIG. 1 also includes the platform's basic input/output system (BIOS) code 125. In other embodiments, BIOS 125 and NV signature 124 may be stored on different nonvolatile storage resources.

In at least one embodiment, trusted server 101 is a "safe" server, i.e., a server with which platform 102 has established or is capable of establishing a trusted relationship such that platform 102 can authenticate trusted server 101 as the source, author, and/or owner of various unattended deployment objects disclosed herein. Trusted server 101 is illustrated in FIG. 1 as being physically located within the premises of a platform provider 103 and logically located within a firewall-segregated intranet (not explicitly depicted) of platform provider 103, which may correspond to an entity that provides and supports unattended deployment services and features disclosed herein. In at least some embodiments, platform provider 103 may correspond to a manufacturer and/or distributor of platform 102.

The communicative coupling between trusted server 101 and platform 102 may traverse one or more private and/or public networks (not explicitly depicted in FIG. 1) including, without limitation, the Internet. Thus, unattended deployment as described herein encompasses the unattended deployment of remotely located platforms.

The deployment system 100 illustrated in FIG. 1 includes a license database 104 communicatively coupled to trusted server 101. As suggested by its name, license database 104 may include data pertaining to software, firmware, and/or hardware licenses associated with platform 102. In at least one embodiment, license database 104 includes information indicative of the existence and status of an unattended deployment license associated with platform 102. Unattended deployment license information may include or otherwise indicate one or more unique identifiers of platform 102 and/or information handling resources provided within platform 102 as well one or more unique identifiers of objects associated with the licensed unattended deployment service. As a non-limiting example, the unattended deployment license associated with a particular platform may include information indicative of the specific platform and a specific deployment key corresponding to that platform. In this manner, an unattended deployment service license may be closely bound to the specific platform, one or more resources installed in the platform including, as an example, a nonvolatile storage device of the platform, and a particular instance of a deployment-specific object associated with the specific platform. Any unattended deployment license information identifying a platform, a component or resource of the platform, or one or more unattended deployment objects may be encrypted to preserve confidentiality in the event that the license is made public, whether intentionally or otherwise. Although license database 104 is illustrated in FIG. 1 as a cloud-based resource, license database 104 may be entirely or partially located and maintained on-premises by platform provider 103.

FIG. 1 further illustrates various unattended deployment objects used in connection with disclosed unattended deployment methods and processes. The unattended deployment objects depicted in FIG. 1 include a combination of data objects and method objects. The depicted unattended deployment objects include a deployment key signature 140, an unattended deployment execution binary 142, and one or more unattended deployment scripts 144, all stored in deployment key 110, as well as an authorization module 131, a deployment protocol module 132, and the NV signature 124 stored in NV storage resource 120. During unattended deployment, as described in greater detail with respect to FIG. 3, authorization module 131 verifies deployment key signature 140 in deployment key 110 before rebooting into the unattended deploy protocol 132 to authorize unattended deploy binary 142 and launch unattended deployment scripts.

Figure 2:
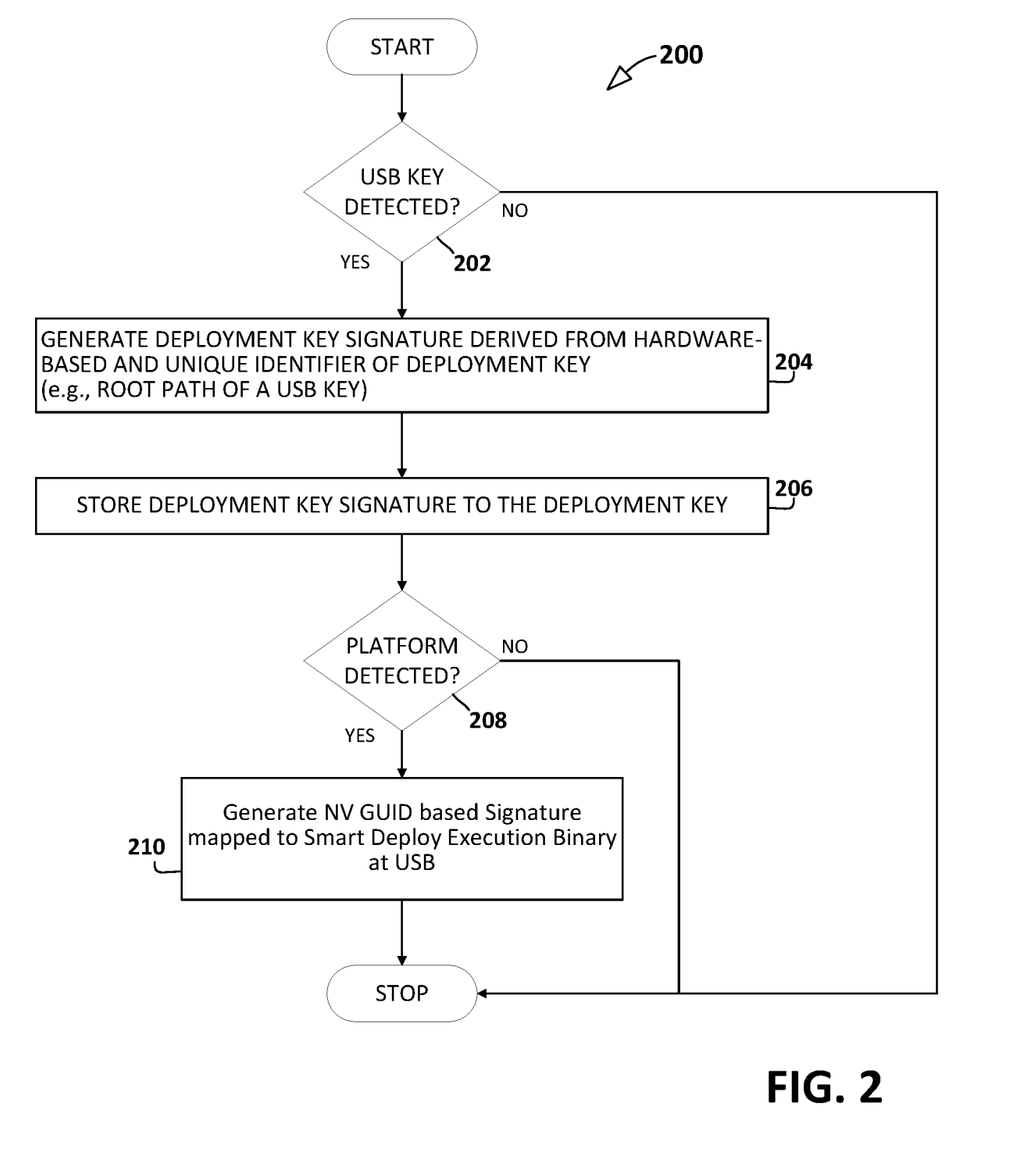
FIG. 2 illustrates a block diagram of information handling resource components for unattended deployment of a target platform.

Referring now to FIG. 2, a flow diagram illustrates a method 200 for generating one or more of the unattended deployment objects illustrated in FIG. 1. The object generation method 200 illustrated in FIG. 2 supports a 3-factor secured, unattended deployment service that is tightly bound to a specific and uniquely identifiable platform, a specific and uniquely identifiable deployment key 110, and a signed unattended deployment executable binary 142 stored in deployment key 110.

In at least one embodiment, method 200 is performed by trusted server 101 while platform 102 is still within the premises of platform provider 103 and before platform 102 is sold, distributed, or otherwise made available to an end user. Platform 102 may be communicatively coupled to trusted server 101 and deployment key 110 may be plugged into or otherwise communicatively coupled to platform 102 while method 200 is carried out. In at least some embodiments, platform 100 may be powered on and booted into a manufacturing mode before method 200 is performed.

Upon detecting (block 202) deployment key 110, trusted server 101 generates (block 204) deployment key signature 140 and stores (block 206) deployment key signature 140 in deployment key 110. In at least one embodiment, deployment key signature 140 is derived from a unique and hardware-based identifier of deployment key 110. For example, in embodiments that employ a USB key as deployment key 110, deployment key signature 140 may be derived from a hardware-based and unique identifier of the USB key such as the USB key's root path. Deployment key 110 may be generated by trusted server 101 using private key/public key encryption. For example, trusted server 101 may invoke a key generation algorithm to obtain a public key, which is stored in or otherwise made accessible to platform BIOS, and a corresponding private key, which is kept secure. Trusted server 101 may then generate deployment key signature 140 by encrypting the unique identifier of deployment key 110 with an appropriate encryption algorithm using the private key as the encryption input.

After generating deployment key signature 140 and storing the signature in deployment key 140, trusted server may perform a similar process to generate NV signature 124 (FIG. 1). For example, upon detecting platform 102 (block 208), trusted server 101 may generate (operation 210) NV signature 124 based on the GUID 123 of NV storage resource 120. In some embodiments, trusted server may use two different encryption algorithms and/or two distinct private key/public key pairs to generate deployment key signature 140 and NV signature 124.

Figure 3:
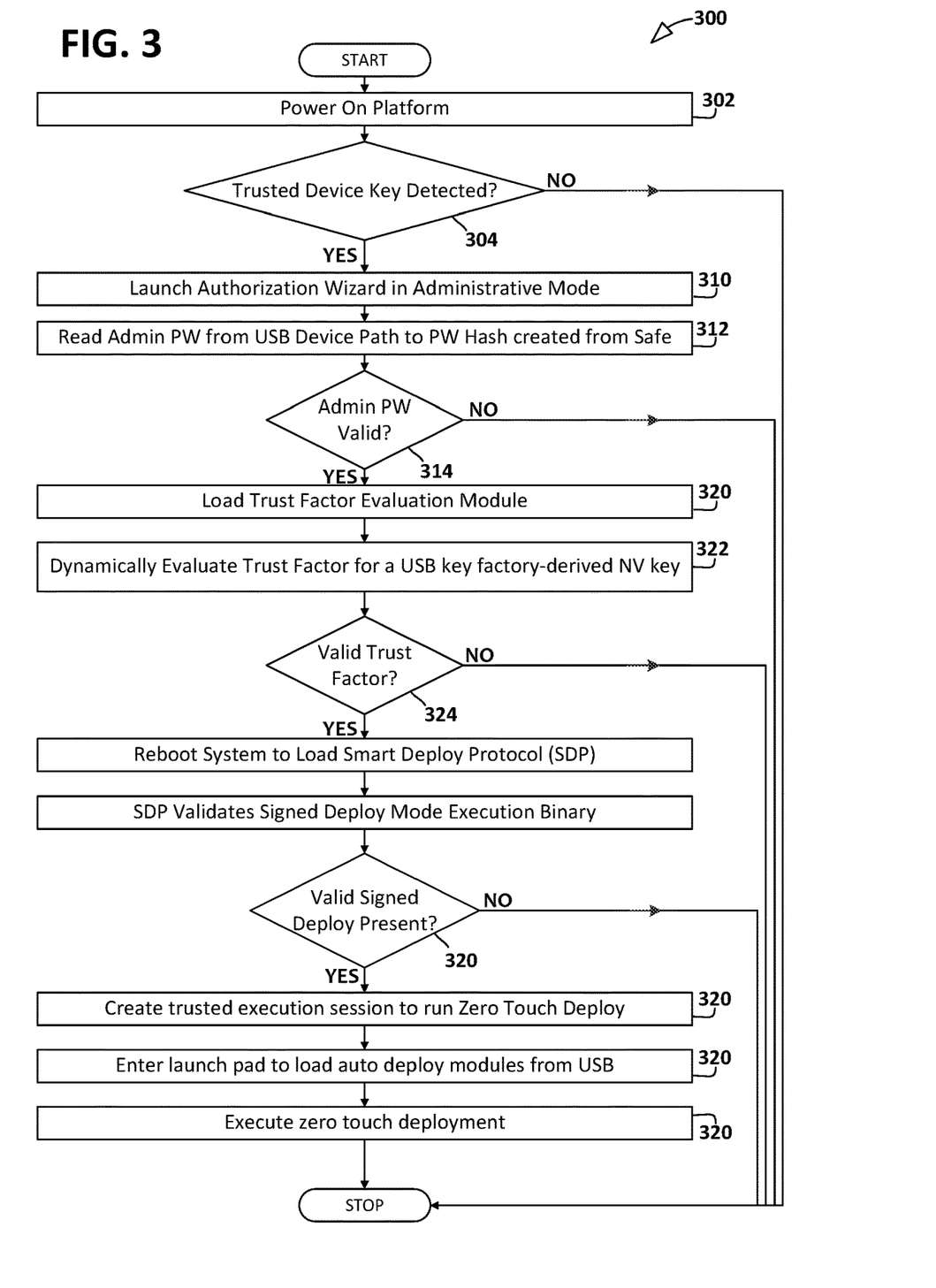
FIG. 3 illustrates a block diagram of a method for creating a safe signature suitable for use in an unattended deployment.

FIG. 3 illustrates a flow diagram of an exemplary unattended deployment process 300. Consistent with disclosed features for performing a secure, zero-touch deployment of an information handling system, such as platform 102, the illustrated method may be performed remotely at an end user location, such as the end user's residence, school, office, or the like. In the following description of the illustrated method 300, the information handling system undergoing unattended deployment is referred to as the targeted platform.

The deployment process 300 illustrated in FIG. 3 begins when the targeted platform detects (block 302) a power on signal or event. Boot code or firmware in the targeted platform may respond to the power on event by first determining whether any hardware key is connected to the platform and, if so, whether (block 304) the attached hardware key is a trusted deployment key such as the previously referenced deployment key 110. Determining whether a USB key or any other suitable type of hardware key connected to the targeted platform is a trusted deployment key may include validating a unique identifier of the hardware key against a deployment key signature stored in the deployment key. Referring momentarily back to FIG. 1 to illustrate this feature, the targeted platform, upon detecting a USB key or another suitable type of hardware key or network storage key connected to or otherwise communicatively coupled to the platform, may determine the GUID 111 of the attached key and validate the GUID 111 against the deployment key signature 140 stored in the key. Validating the GUID may include decrypting the deployment key signature based on a public key provided by platform provider 103 and accessible to the platform's BIOS.

If the targeted platform successfully validates an attached hardware key as a deployment key 110, the targeted platform's firmware may proceed to block 310, in which the platform establishes an execution environment referred to herein as an administrative mode and launches an authorization module to validate the platform's unattended deployment credentials before undertaking the actual unattended deployment of the targeted platform. As depicted in FIG. 3, the targeted platform reads (block 312) an administrator password stored within a predetermined device path of deployment key 110 and validates the password against an administrative password hash 141 generated by trusted server 101 and stored in deployment key 110. In this manner, deployment key 110 can provide credentials to the targeted platform. If the admin password is validated (block 314), a trust factor evaluation module is loaded (block 320) to dynamically evaluate the deployment key signature against the NV signature (block 322).

If the trust factor is validated, the platform boots (block 330) into a secure execution environment referred to herein as a deploy mode protocol or, more simply, deploy mode 132. Deploy mode 132 then validates (block 332) signed deploy mode execution binary 142 (FIG. 1) and determines (block 334) whether a valid signed deploy binary is present. If so, a trusted execution session is created (block 336) to run zero touch deployment. A launch pad may then be entered to load (block 340) unattended deployment scripts 144 (FIG. 1) from the deployment key 110 and the zero touch deployment is executed (block 342).

Figure 4:
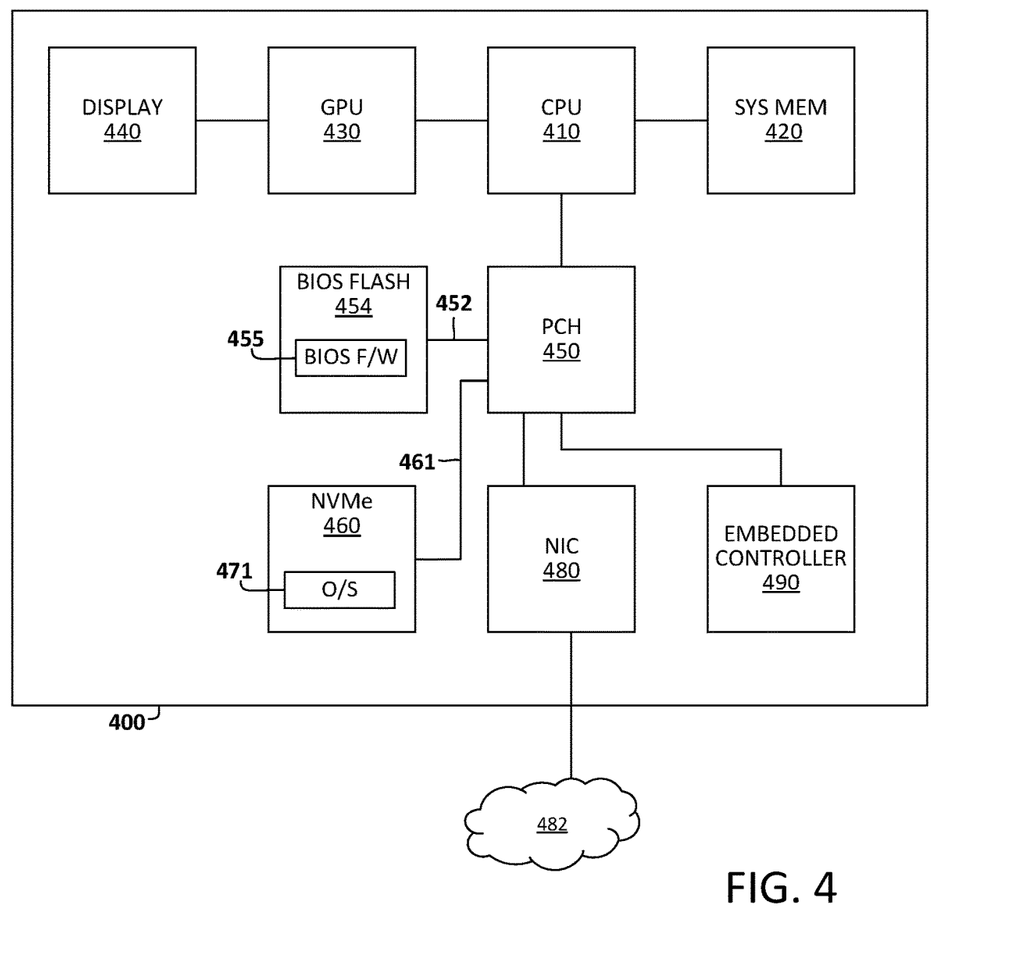
FIG. 4 illustrates a block diagram of an information handling system in accordance with disclosed subject matter.

Referring now to FIG. 4, an exemplary information handling system 400 (e.g., a desktop, laptop, or tablet computer)suitable for use as the platform 102 illustrated in FIG. 1 is illustrated in block diagram format. As shown in FIG. 4, information handling system 400 includes at least one central processing unit (CPU) 410 (e.g., a host processor), a system memory 420, a graphics processor unit (GPU) 430, a display device 440, a chipset device referred to as platform controller hub (PCH) 450, a BIOS flash 454 containing BIOS firmware 455, a non-volatile memory express (NVMe) storage resource 460, a network interface card (NIC) 480, and an embedded controller (EC) 490.

System memory 420 is communicatively coupled to CPU 410 and generally configured to store program instructions (or computer program code), which are executable by CPU 410. System memory 420 may be implemented using any suitable memory technology, including but not limited to, dynamic random access memory or any other suitable type of memory. The GPU 430 is coupled to CPU 410 and configured to coordinate communication between the host processor and one or more display devices. In the embodiment shown in FIG. 4, GPU 430 is coupled to display device 440 and configured to provide visual images (e.g., a graphical user interface, messages and/or user prompts) to the user.

The PCH 450 is coupled to CPU 410 and configured to handle I/O operations to and from CPU 410. As such, PCH 450 may include a variety of communication interfaces and ports for communicating with various system components, input/output (I/O) devices, expansion bus(es), and so forth. The PCH 450 illustrated in FIG. 4 interfaces with a serial peripheral interface (SPI) bus 452, to which a BIOS flash 454, containing BIOS firmware 455 is coupled.

PCH 450 is further coupled to an NVMe storage resource 460. NVMe storage resource 460 may include a NAND flash solid state drive (SSD) configured with a PCIe interface for coupling to a PCIe bus 461. NVMe storage resource 460 is generally configured to store software and/or data. For example, NVMe storage device 460 may store an operating system (OS) image 471, in addition to other software and/or firmware modules and user data.

The NIC 480 enables platform 400 to communicate with one or more remotely located systems and/or services 484 via an external network 482 using one or more communication protocols. Network 482 may be a local area network (LAN), wide area network (WAN), personal area network (PAN), or the like, and the connection to and/or between IHS 400 and network 482 may be wired, wireless or a combination thereof. For purposes of this discussion, network 482 is indicated as a single collective component for simplicity. However, it is appreciated that network 482 may comprise one or more direct connections to other remote systems and/or services, as well as a more complex set of interconnections as can exist within a wide area network, such as the Internet. NIC 480 may communicate data and signals to/from IHS 400 using any known communication protocol.

Embedded controller (EC) 490 is generally configured to boot the information handling system and perform other functions. EC 490 may generally include read only memory (ROM), random access memory (RAM) and a processing device (e.g., a controller, microcontroller, microprocessor, ASIC, etc.) for executing program instructions stored within its internal ROM and RAM. For example, EC 490 may be configured to execute program instructions (e.g., a boot block) stored within its internal ROM to initiate a boot process for the information handling system.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method of deploying an information handling system, the method comprising:
   responsive to detecting a power on signal, determining whether a key resource coupled to the information handling system is a deployment key for the information handling system, wherein said determining includes validating a globally unique identifier of the key resource against a deployment key signature, generated by a trusted server, stored on the key resource;
   responsive to validating the key resource as the deployment key, performing a trust factor validation wherein the trust factor validation includes evaluating a trust factor for the deployment key against a second key, wherein the second key is bound to a nonvolatile storage component of the information handling system, wherein the nonvolatile storage component stores a second key signature, generated by the trusted server, based on a globally unique identifier (GUID) of the nonvolatile storage component;
   responsive to validating the trust factor, rebooting the information handling system into an unattended deployment mode loaded from the deployment key;
   validating an unattended deployment binary stored in the deployment key against the second key signature to establish a trusted execution session for loading one or more unattended deployment modules from the deployment key and deploying the information handling system by executing the one or more unattended deployment modules.

2. The method of claim 1, wherein the key resource comprises a Universal Serial Bus (USB) key.

3. The method of claim 2, wherein the globally unique identifier of the key resource comprises a root path of the USB key.

4. The method of claim 1, wherein the key resource comprises a network storage resource.

5. The method of claim 1, wherein a basic input/output system (BIOS) of the information handling system performs the trust factor validation.

6. The method of claim 1, wherein the trust factor validation includes launching an authorization module to:
   read an administrative password from the deployment key; and
   validate the administrative password against a password hash, generated by the trusted server, stored in the deployment key.

7. The method of claim 1, wherein the unattended deployment binary includes a digital signature generated by the trusted server and wherein validating the unattended deployment binary comprises validating the digital signature against the GUID of the nonvolatile storage component.

8. The method of claim 1, wherein the unattended deployment mode comprises a manufacturing mode enabling the information handling system to run unsigned code including scripts.

9. The method of claim 8, wherein deploying the information handling system includes configuring one or more information handling system settings accessible only in the manufacturing mode.

10. The method of claim 9, wherein the nonvolatile storage component comprises a flash BIOS of the information handling system.

11. An information handling system, comprising:
   at least one central processing unit (CPU);
   a system memory, accessible to the at least one CPU, comprising processor executable instructions that, when executed by the CPU, perform deployment operations including:
      responsive to detecting a power on signal, determining whether a key resource coupled to the information handling system is a deployment key for the information handling system, wherein said determining includes validating a globally unique identifier of the key resource against a deployment key signature, generated by a trusted server, stored on the key resource;
      responsive to validating the key resource as the deployment key, performing a trust factor validation wherein the trust factor validation includes evaluating a trust factor for the deployment key against a second key, wherein the second key is bound to a nonvolatile storage component of the information handling system, wherein the nonvolatile storage component stores a second key signature, generated by the trusted server, based on a globally unique identifier (GUID) of the nonvolatile storage component;
      responsive to validating the trust factor, rebooting the information handling system into an unattended deployment mode loaded from the deployment key;
      validating an unattended deployment binary stored in the deployment key against the second key signature to establish a trusted execution session for loading one or more unattended deployment modules from the deployment key and deploying the information handling system by executing the one or more unattended deployment modules.

12. The information handling system of claim 11 wherein the key resource comprises a Universal Serial Bus (USB) key.

13. The information handling system of claim 12, wherein the globally unique identifier of the key resource comprises a root path of the USB key.

14. The information handling system of claim 11 wherein the key resource comprises a network storage resource.

15. The information handling system of claim 11 wherein a BIOS of the information handling system performs the trust factor validation.

16. The information handling system of claim 11 wherein the trust factor validation includes launching an authorization module to:
   read an administrative password from the deployment key; and
   validate the administrative password against a password hash, generated by the trusted server, stored in the deployment key.

17. The information handling system of claim 11 wherein the unattended deployment binary includes a digital signature generated by the trusted server and wherein validating the unattended deployment binary comprises validating the digital signature against the GUID of the nonvolatile storage component.

18. The information handling system of claim 11 wherein the unattended deployment mode comprises a manufacturing mode enabling the information handling system to run unsigned code including scripts.

19. The information handling system of claim 18, wherein deploying the information handling system includes configuring one or more information handling system settings accessible only in the manufacturing mode.

20. The information handling system of claim 19, wherein the nonvolatile storage component comprises a flash BIOS of the information handling system.

* * * * *